(12) United States Patent
Mascioletti et al.

(10) Patent No.: US 6,503,020 B1
(45) Date of Patent: Jan. 7, 2003

(54) CONNECTOR SYSTEM FOR STRUCTURAL MEMBERS

(76) Inventors: Marco Mascioletti, Via S. Francesco No. 5, L'Aquilla 67100 (IT); Americo Maria Cicolani, 1245 Vine St., Hollywood, CA (US) 90038; Massimo Pulsoni, Via R. Cappelli No. 8, L'Aquila 67100 (IT)

( * ) Notice: Subject to any disclaimer, the term of this patent is extended or adjusted under 35 U.S.C. 154(b) by 0 days.

(21) Appl. No.: 09/617,023

(22) Filed: Jul. 14, 2000

(51) Int. Cl.$^7$ .................................................. F16B 9/00
(52) U.S. Cl. ........................................ 403/402; 403/231
(58) Field of Search .......................... 403/230, 231, 403/401, 402, 403, 205, 258, 260

(56) References Cited

U.S. PATENT DOCUMENTS

| | | | | |
|---|---|---|---|---|
| 3,673,674 A | * | 7/1972 | Catulle ................... 403/401 X |
| 3,835,610 A | * | 9/1974 | Harper et al. ............ 403/231 X |
| 3,884,002 A | * | 5/1975 | Logie .......................... 52/285 |
| 4,261,665 A | * | 4/1981 | Hsiung ...................... 403/231 |
| 4,405,253 A | * | 9/1983 | Stockum .................... 403/231 |
| 4,981,388 A | * | 1/1991 | Becken et al. ............ 403/258 |
| 5,468,086 A | * | 11/1995 | Goya ......................... 403/260 |
| 5,802,780 A | * | 9/1998 | Hammerschlag ............ 52/105 |
| 6,257,799 B1 | * | 7/2001 | Ribe ........................... 403/402 |

* cited by examiner

Primary Examiner—Lynne H. Browne
Assistant Examiner—John R. Cottingham
(74) Attorney, Agent, or Firm—Donn K. Harms

(57) ABSTRACT

A connection system for securing structural members such as posts and beams together with all connection components hidden within the structural members. Cylindrical connectors fit in apertures in the members. Each connector has transverse holes and end holes, at least some of which are threaded. Each connector is secured in the aperture by bolts or pins extending through aligned holes in a member and a transverse hole. Bolts and pins extend through one structural member into holes in the connectors in the second members to secure the members together. In some embodiments, two cooperating cylindrical connectors are secured in two apertures in ends of structural members, with bolts extending between the two connectors to secure them and the structural members together.

8 Claims, 3 Drawing Sheets

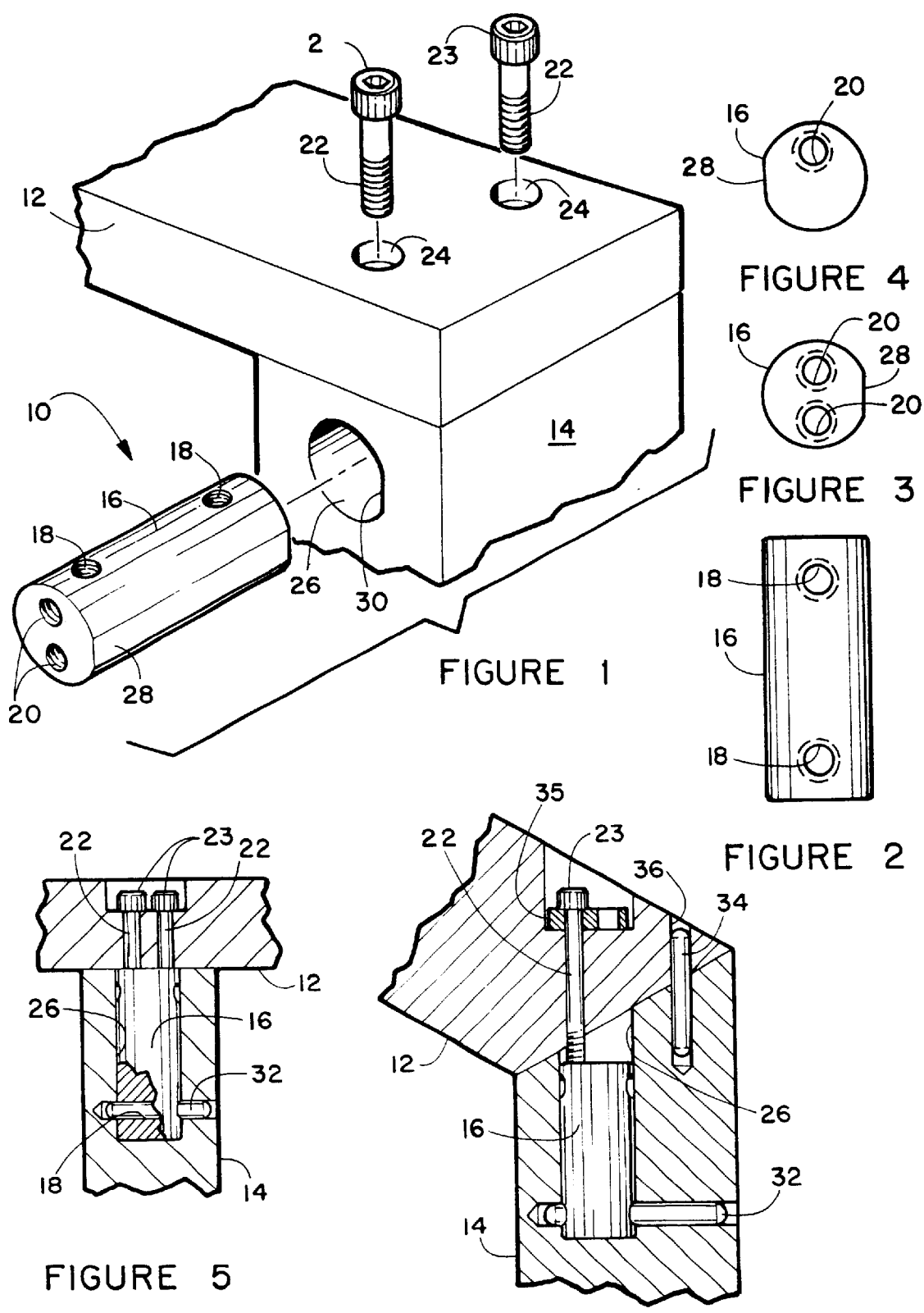

CONNECTOR SYSTEM FOR STRUCTURAL MEMBERS

FIELD OF THE INVENTION

This invention relates to connectors for connecting structural members, in particular the connecting wooden beams together at various angles with the connectors hidden.

BACKGROUND OF THE INVENTION

Many methods exist for connecting wooden structure elements together both at angles an one positioned over the other. Such methods include nails, bolts, screws, and the like.

A variety of shaped sheet metal brackets are available, such as those manufactured and distributed by Simpson Strong-Tie CO., Inc., etc. These brackets are generally formed from heavy gage galvanized sheet metal and have a hanger surrounding an end of one wooden member such as a joist or beam and a flange portion engaging the other member such as a post or stud. The hanger and flange are fastened to the wood with nails.

These devices are successful for holding wooden structural members together. However these connectors may allow relative movement of the members during earthquakes, tornadoes, other severe storms and the like, severely weakening the connection, since forces applied to a connection can easily loosen nailed fasteners. In order to accommodate connections made at different angles, with wooded members having different dimensions a wide variety of different brackets must be made and kept in inventory. When used in outdoor applications, the exposed brackets are subject to unsightly rusting which can cause staining the adjacent wood. Also, these connectors are not attractive when exposed to view in the completed structure, such as with exposed ceiling beams.

In some wood joining applications, such as door frames, window frames and shutters, the joints are usually held together by glue which can easily crack and separate when stressed or jolted. Separation of the joint weakens the structure and is unsightly. Further, glue joints cannot be easily disassembled for maintenance such as replacement of a defective or damaged part.

Thus, there is a continuing need for improved connector systems for wooden structures that improved resistance to connector movement, provide high strength and provide an attractive appearance.

SUMMARY OF THE INVENTION

The above-noted problems, and others, are overcome by the connector system of this invention which basically comprises a kit for each connection that includes at least one cylindrical component having two spaced holes in an end of the cylinder and two transverse holes through the side of the cylinder. The end holes are parallel to the cylinder axis and the transverse apertures are preferably perpendicular to the cylinder axis. At least some of the holes are threaded. The kit further includes bolts sized to thread into threaded holes and pins sized to slide into the threaded or unthreaded holes.

While not all of the holes need to be threaded, as detailed in the description below of several embodiments of this invention, if desired for greatest versatility and to use the smallest number of different cylinders, all of the holes could be threaded and could receive either bolts or pins as desired.

If desired, holes may have two different diameters, a narrow portion for receiving the threaded portion of a bolt or the like and a wider, countersunk, portion to receive the bolt head below the surface of the cylinder.

BRIEF DESCRIPTION OF THE DRAWING

Details of the invention, and of preferred embodiments thereof, will be further understood upon reference to the drawing, wherein:

FIG. 1 is a perspective view of a first embodiment of a connection system using the connector of this invention with two transverse connecting bolts;

FIG. 2 is a plane view of the connector of FIG. 1;

FIG. 3 is an end elevation view of the connector of FIG.

FIG. 4 is an end elevation view of a variation on the connector of FIG. 1;

FIG. 5 is an elevation view of a second embodiment of the connection system installed in wooden members with the wood cut away to show the connector;

FIG. 6 is an elevation view of a third embodiment of the connection system installed in wooden members with the wood cut away to show the connector;

DETAILED DESCRIPTION OF PREFERRED EMBODIMENTS

Figure 7:
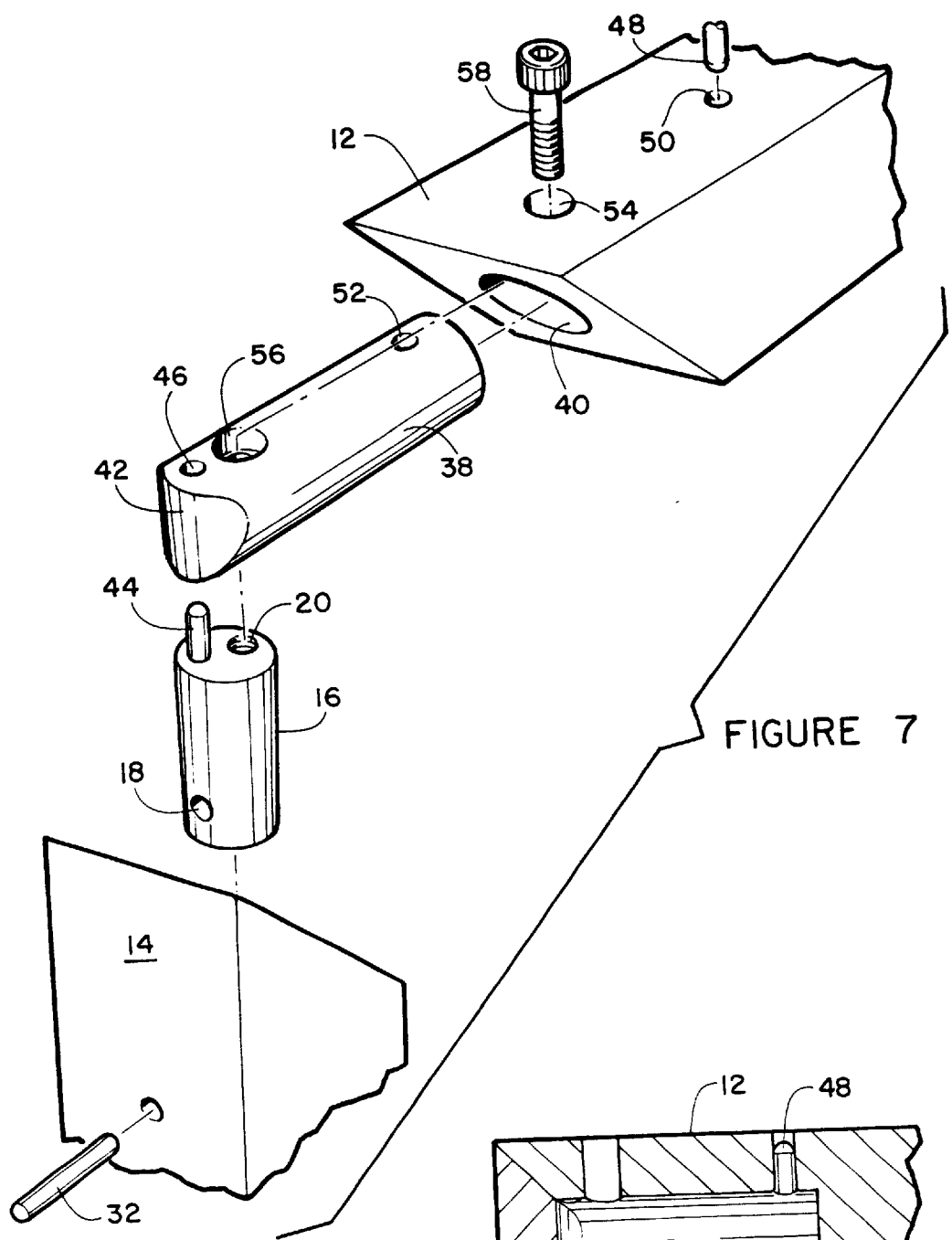
FIG. 7 is an exploded perspective view of a fourth embodiment of the connection system, using two connectors.

Referring to FIGS. 1–4, there is seen a first embodiment of the connection system 10 installed so as to hold ends of elongated members 12 and 14 in a strong, stable relationship. While FIG. 1 shows members 12 and 14 overlapping at a 90° relative angle, they may meet at any other suitable angle, as illustrated in other Figures. Members 12 and 14 may be formed from any suitable material, such as wood, plastics, metal and the like. The probable major use for the system will be with wooden members 12 and 14.

The connection system 10 comprises a generally cylindrical connector 16 having at least one transverse hole 18 and/or at least one end hole 20 lying generally parallel to the axis of the cylindrical connector. In the FIG. 1 embodiment, two spaced, parallel holes 18 are provided for the preferred maximum effectiveness. Bolts 22 pass through holes 24 in member 12 into threaded holes 18 in connector 16 which is inserted in a corresponding aperture 26 in member 14. Holes 24 are preferably enlarged near the surface of member 12 so as to countersink bolt heads 23 below the surface.

The two end holes 20 seen in FIG. 1 are not required for the FIG. 1 embodiment, but are shown since they are provided as the optimum connector embodiment so as to permit the connector to be used in other embodiments, as discussed below.

As detailed below, in different embodiments holes 18 and 20 in connector 16 may receive either bolts or pins, so may be threaded or smooth. Where a number of connectors 16 are to be used in only one of the various arrangements shown in the Figures, only those holes that are to receive bolts may be threaded and those to receive pins may be smooth. However, for greatest versatility, all holes 18 and 20 will be threaded, with the pins sized to slide into the treaded holes and bolts sized to thread therein. There is another advantage of having all holes threaded in that the threads will "bite" slightly into the pins under transverse loads and help retain them in place.

If desired, a longitudinal flat area 28 may be provided on connector 16 with a corresponding longitudinal flat area 30 inside aperture 26 to aid in orienting holes 18 to receive bolts 22. Flat area 30 is most conveniently provided where aperture 26 is formed by molding during molding of a plastic member 14. An alignment arrangement is not necessary where two end holes 20 are provided, since the connector may be easily oriented with those holes parallel with the length of member 14. However, if desired any other suitable alignment arrangement may be provided, such as marks on the end of a connector 16 that has no end holes 20, a longitudinal ridge along connector 16 and a corresponding longitudinal recess in aperture 26, etc., as desired. FIG. 4 shows a variation in which no flat 28 is provided, but a single hole 20 is provided to aid in orientation.

A second embodiment of connector system 10 is illustrated in FIG. 5. Here, aperture 26 is formed in an end of member 14 with bolts 22 extending through member 12 into threaded end holes 20 (not seen, but the same as shown in FIG. 1). Connector 16 is held in aperture 26 by at least one pin 32 passing through aligned holes in member 14 and hole 18 in connector 16 (as seen in the small cut away area). Two or more pins 32 and cooperating holes 18 may be used, if desired. Hole 18 may be smooth or threaded. If threaded, the threads will dig into pin 32 slightly as bolts 22 are tightened, further retaining pin 32 in place.

A third embodiment of connector system 10 is shown in FIG. 6. Here, connector 16 is installed in an aperture 26 in member 14. Member 12 meets an end of member 14 at an angle, which may vary between 90° as seen in FIG. 5 and any suitable angle.

Bolt 22 extends into an end hole in connector 16 with a pin 32 extending into a connector side hole, as described previously. A pin 34 extends into an inter-member hole 36 that passes across the interface between members 12 and 14 to prevent any relative twisting movement between the two members. While two bolts 22 could be used as seen in FIG. 5, the greater spacing between bolt 22 and pin 32 in FIG. 6 will provide greater resistance to twisting moments. A washer 35 is provided (and may be provided with the other system embodiments, as desired) to aid in tightening bolt 22 and protect the abutting portion of member 12 from crushing during bolt tightening.

Figure 8:
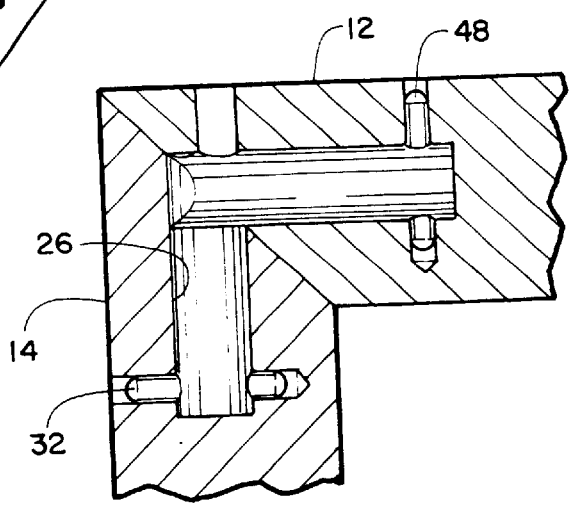
FIG. 8 is an elevation view of the embodiment of FIG. 7 installed in wooden members with the wood cut away to show the connector.

A fourth embodiment of connector system 10 is illustrated in FIGS. 7 and 8. Here, one connector 16 as described above is used in cooperation with a second connector 38 which is a modified version of connector 16.

Connector 16 is installed in an aperture 26 and held in place by a pin 32 extending through a transverse hole 18, as discussed above. A second connector 38 is installed in a second aperture 40 in member 12. Preferably, second connector 38 has an end 42 shaped to match the configuration of aperture 26, although if desired an aperture could be formed in member 14 as a continuation of second aperture 40 to permit a flat end on second connector 38.

A pin 44 in an end hole 20 of connector 16 fits into a corresponding hole 46 in second connector 38. A pin 48 extends through a hole 50 in member 12 and a transverse hole 52 in second connector 38 to lock the connector in aperture 40.

Holes 54 in member 12 and 56 in second connector 38 align with end hole 20, so that bolt 58 can thread through into end hole 20 and lock the connectors together.

Figures 9, 10:
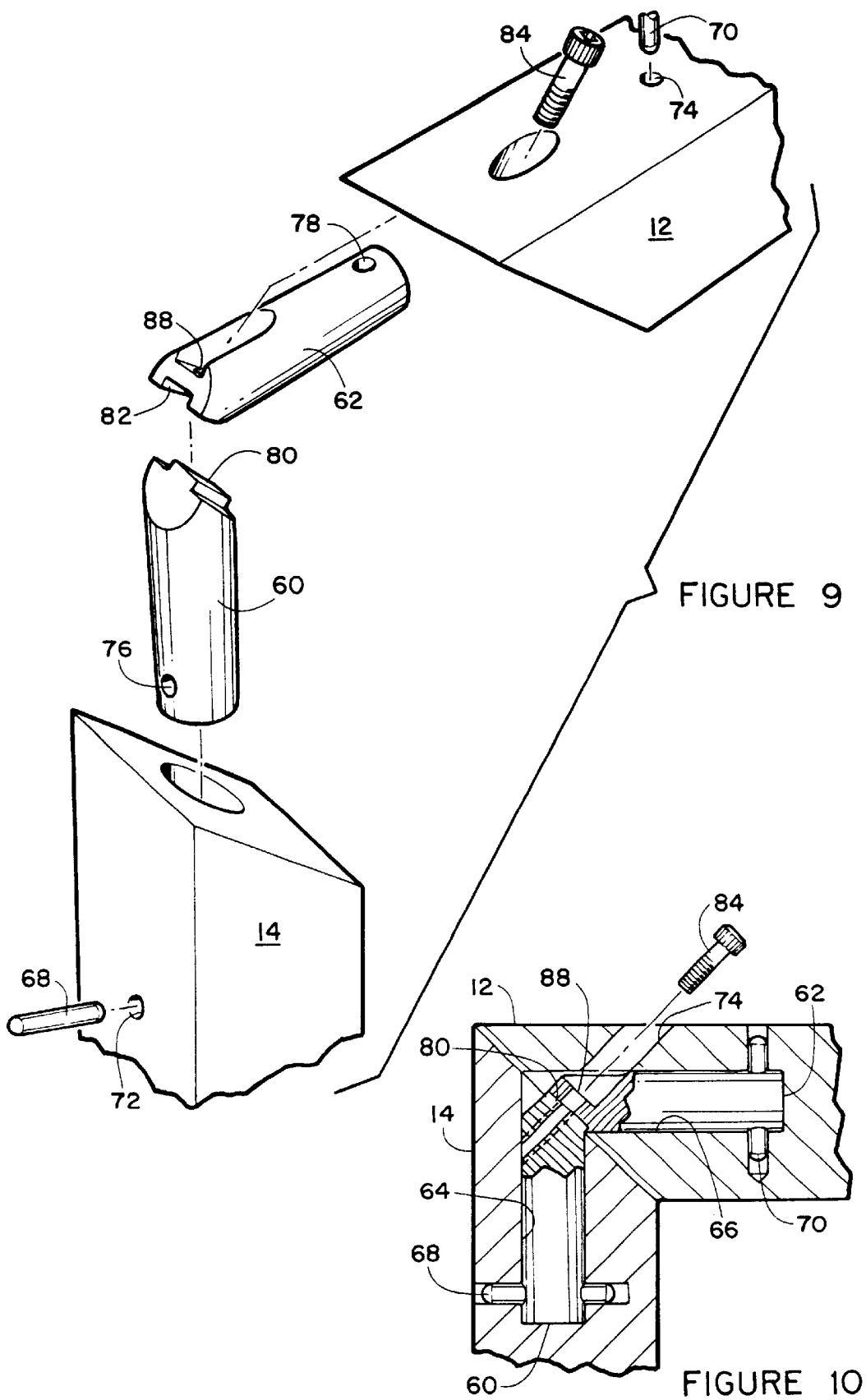
FIG. 9 is an exploded perspective view of a fifth embodiment of the connection system, using two interlocking connectors.
FIG. 10 is an elevation view of the embodiment of FIG. 9 installed in wooden members with the wood cut away to show the connector.

A fifth embodiment of connection system 10 is illustrated in FIGS. 9 and 10. Here, third and fourth connectors 60 and 62 with modified end configurations from those discussed above are inserted in corresponding apertures 64 and 66, respectively, in members 12 and 14, respectively. Pins 68 and 70 pass through holes 72 and 74 in members 14 and 12 and into transverse holes 76 and 78 in connectors 60 and 62, respectively, to secure the connectors in their respective apertures.

The distal ends of connectors 60 and 62 are slanted in accordance with the angle between members 12 and 14 and bear a cooperating set of raised ridge 80 and recess 82. Preferably ridge 80 and recess 82 have an interlocking dovetail configuration, although a straight-sided ridge and slot-like recess may be used if desired. A bolt 84 extends through hole 86 in member 12, a hole 88 in connector 62 and bears against ridge 80 to lock the two connectors together.

The embodiment of FIGS. 9 and 10 has the ability to be rapidly assembled and disassembled. Once connectors 60 and 62 are locked in their respective apertures by pins 68 and 70, the cooperating recess 82 and ridge 80 can be quickly slid together and bolt 84 can be tightened to lock the connection. The connection can be quickly disassembled by loosening bolt 84 and sliding the connectors apart.

While certain specific relationships, materials and other parameters have been detailed in the above description of preferred embodiments, those can be varied, where suitable, with similar results. Other applications, variation and ramifications of the present invention will occur to those skilled in the art upon reading the present disclosure. Those are intended to be included within the scope of this invention as defined in the appended claims.

We claim:

1. A connector kit for use in connecting structural members together, which comprises:

an axially elongated generally cylindrical first connector having a central longitudinal axis for placement in an aperture in a first structural member;

at least one transverse hole through said first connector;

at least two end holes in an end of said first connector, both said holes lying parallel to said cylinder axis with at least a one end hole being threaded;

an axially elongated generally cylindrical second connector for placement in an aperture in a second structural member;

a first transverse hole in said second connector configured to align with a first of said first connector end holes for receiving a first pin extending therebetween;

a second transverse hole through said second connector, said second transverse hole being configured to align with said threaded first connector end hole; and a bolt configured to extend through said second transverse hole and thread into said threaded first connector end hole.

2. The connector kit according to claim 1 further including a third transverse hole through said second connector, spaced from and generally parallel to said first transverse hole, said third traverse hole for receiving a pin extending through a hole in said second structural member and said second transverse hole.

3. The connector kit according to claim 1 wherein said first and second transverse holes in said second connector are adjacent to a first end of said second connector and are adapted to overlie an end of said first connector, said first end shaped to conform with the end shape of said first connector.

4. The connector kit according to claim 1 wherein said transverse hole in said first connector is configured to receive a pin extending through said first structural member and said first connector transverse hole.

5. A connector kit for use in connecting structural members together, which comprises:

- at least one axially elongated generally cylindrical first connector;
- at least one transverse hole through said first connector;
- at least one axially elongated generally cylindrical second connector;
- at least one transverse hole through said second connector;
- engagement means for aligning said first ends of said first and second connectors in a predetermined relationship;
- an unthreaded hole extending through said first end of said second connector;
- a threaded hole in said first end of said first connector, said threaded hole configured to align with said unthreaded hole through said first end of said second connector when said engagement means is engaged; and
- a bolt sized to fit through said unthreaded hole through said first end of said second connector and thread into said threaded hole through said first end of said first connector to secure said first and second connectors together.

6. The connector kit according to claim 5 wherein said engagement means comprises a ridge on said first end of one of said first and second connectors and a cooperating recess on said first end of the other of said first and second connectors.

7. The connector kit according to claim 6 wherein said ridge and recess have a dovetail configuration.

8. The connector kit according to claim 5 herein said transverse holes in said first and second connectors are configured to receive a pin extending through said first structural member and said first and connector transverse hole third transverse hole being configured to align with said threaded first connector end hole; and

- a bolt configured to extend through said second transverse hole and thread into said threaded first connector end hole.

* * * * *